United States Patent
Didey

(10) Patent No.: US 10,864,984 B2
(45) Date of Patent: Dec. 15, 2020

(54) LANDING GEAR DRIVE SYSTEM FLEXIBLE INTERFACE

(71) Applicant: AIRBUS OPERATIONS LIMITED, Bristol (GB)

(72) Inventor: Arnaud Didey, Bristol (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 144 days.

(21) Appl. No.: 15/852,725

(22) Filed: Dec. 22, 2017

(65) Prior Publication Data
US 2018/0118333 A1 May 3, 2018

Related U.S. Application Data

(63) Continuation of application No. 14/914,669, filed as application No. PCT/GB2014/052653 on Sep. 3, 2014, now Pat. No. 9,884,678.

(30) Foreign Application Priority Data

Sep. 5, 2013 (GB) .................................. 1315802.7
Jun. 5, 2014 (GB) .................................. 1410034.1

(51) Int. Cl.
*B64C 25/40* (2006.01)
*F16H 1/06* (2006.01)
(Continued)

(52) U.S. Cl.
CPC ........... *B64C 25/405* (2013.01); *F16H 1/006* (2013.01); *F16H 1/06* (2013.01); *F16H 1/26* (2013.01); *Y02T 50/80* (2013.01)

(58) Field of Classification Search
CPC ...... F16H 57/0025; F16H 35/008; F16H 1/26; F16D 3/10; B64C 25/40; B64C 25/405
See application file for complete search history.

(56) References Cited

U.S. PATENT DOCUMENTS 2,453,279 A 11/1948 Starbuck
2,578,764 A 12/1951 Trbojevich
(Continued)

FOREIGN PATENT DOCUMENTS

DE 2103190 8/1971
DE 3020544 A1 12/1981
(Continued)

OTHER PUBLICATIONS

English translation of Notification of Reasons for Refusal for Japanese Application No. 2016-539632, four pages, dated Jul. 24, 2018.

(Continued)

*Primary Examiner* — Bobby Rushing, Jr.
(74) *Attorney, Agent, or Firm* — Nixon & Vanderhye P.C.

(57) ABSTRACT

A drive system for an aircraft landing gear, the drive system including a pinion gear, a drive shaft arranged to rotate the pinion gear about a drive axis, a driven gear arranged to mesh with the pinion gear to be rotatable by the pinion gear, the driven gear being connectable to a wheel of the landing gear to be capable of rotating the wheel about a wheel axis; and a flexible interface. The flexible interface includes a plurality of driven gear coupling members, each driven gear coupling member having a first connection portion attached to the driven gear, a second connection portion adapted to be attached to the wheel at an offset distance from the wheel axis, and a joint between the first connection portion and the second connection portion, the joint permitting relative movement between the first connection portion and the second connection portion.

7 Claims, 7 Drawing Sheets

(51) Int. Cl.
*F16H 1/26* (2006.01)
*F16H 1/00* (2006.01)

(56) References Cited

U.S. PATENT DOCUMENTS

| | | | |
|---|---|---|---|
| 2,687,857 A | | 8/1954 | Caldwell et al. |
| 2,963,103 A | | 12/1960 | Wood, Jr. et al. |
| 3,070,979 A | | 1/1963 | Shipley |
| 3,079,680 A | | 3/1963 | Dier et al. |
| 3,204,429 A | | 9/1965 | Kayser |
| 3,292,390 A | * | 12/1966 | Wildhaber ............ F16D 3/185 464/158 |
| 3,490,306 A | | 1/1970 | Haensgen et al. |
| 3,845,670 A | | 11/1974 | Grayson |
| 4,012,925 A | | 3/1977 | Krude |
| 4,335,963 A | | 6/1982 | Jameson et al. |
| 4,432,741 A | | 2/1984 | Winkler |
| 4,453,830 A | | 6/1984 | Jameson et al. |
| 4,464,141 A | * | 8/1984 | Brown .................. F16D 3/185 464/150 |
| 4,994,005 A | | 2/1991 | Rennerfelt |
| 5,171,185 A | * | 12/1992 | Schneider ............ F16D 3/2055 464/111 |
| 5,393,267 A | * | 2/1995 | Munyon ................ E21B 4/003 464/120 |
| 5,466,198 A | | 11/1995 | McKibbin et al. |
| 5,647,801 A | | 7/1997 | Jacob |
| 5,911,286 A | | 6/1999 | Boutin |
| 6,241,617 B1 | | 6/2001 | Jacob |
| 6,261,184 B1 | | 7/2001 | Jacob et al. |
| 6,443,844 B1 | | 9/2002 | Perrow |
| 6,871,719 B2 | * | 3/2005 | Breese .................. F16D 3/185 464/158 |
| 7,281,984 B2 | | 10/2007 | Foster-Hamilton et al. |
| 7,578,215 B2 | | 8/2009 | Knagge |
| 8,052,345 B2 | | 11/2011 | Byers et al. |
| 8,342,970 B2 | * | 1/2013 | Altimas ................ E21B 4/003 464/120 |
| 8,444,086 B2 | | 5/2013 | Bucheton et al. |
| 8,960,689 B1 | * | 2/2015 | Williams .............. F16D 3/185 280/5.521 |
| 9,506,501 B2 | | 11/2016 | Govert |
| 2004/0231910 A1 | | 11/2004 | Mercier et al. |
| 2005/0005726 A1 | | 1/2005 | Knagge |
| 2005/0111907 A1 | | 5/2005 | Urbach |
| 2005/0119055 A1 | | 6/2005 | Tokuoka et al. |
| 2005/0196227 A1 | | 9/2005 | Mahy et al. |
| 2005/0215330 A1 | | 9/2005 | Foster-Hamilton et al. |
| 2006/0065779 A1 | | 3/2006 | McCoskey et al. |
| 2006/0226621 A1 | | 10/2006 | Byers et al. |
| 2008/0152424 A1 | | 6/2008 | Igarashi et al. |
| 2010/0087260 A1 | | 4/2010 | Maki et al. |
| 2011/0053726 A1 | | 3/2011 | Thompson |
| 2011/0287845 A1 | * | 11/2011 | Downey ................ F16D 3/185 464/159 |
| 2012/0217340 A1 | | 8/2012 | Essinger et al. |
| 2012/0228921 A1 | | 9/2012 | Essinger et al. |
| 2012/0305702 A1 | | 12/2012 | Bucheton et al. |
| 2013/0026284 A1 | | 1/2013 | Christensen et al. |
| 2013/0002339 A1 | | 9/2013 | Charles et al. |
| 2013/0252748 A1 | | 9/2013 | Sugiyama et al. |
| 2014/0011625 A1 | | 1/2014 | Thompson |
| 2014/0158820 A1 | | 6/2014 | Wilson et al. |
| 2014/0225421 A1 | | 6/2014 | Oswald et al. |
| 2014/0245853 A1 | | 9/2014 | Didey |
| 2014/0356027 A1 | | 12/2014 | Yamazaki et al. |
| 2015/0210385 A1 | | 7/2015 | Didey |
| 2015/0337891 A1 | | 11/2015 | Mano |
| 2016/0195167 A1 | * | 7/2016 | Hofmann ............... F16H 1/006 74/405 |

FOREIGN PATENT DOCUMENTS

| | | | | |
|---|---|---|---|---|
| DE | 4328477 A1 | * | 3/1994 | ............ F16D 3/185 |
| EP | 2524816 A1 | | 11/2012 | |
| EP | 2551192 A2 | | 1/2013 | |
| FR | 474613 | | 3/1915 | |
| GB | 390438 | | 4/1933 | |
| GB | 556203 A | | 9/1943 | |
| GB | 2080491 A | | 2/1982 | |
| GB | 2152173 A | | 7/1985 | |
| JP | 1938001641 | | 2/1938 | |
| JP | 4516 Y1 | | 1/1970 | |
| JP | 58190117 | | 11/1983 | |
| JP | H0882326 | | 3/1996 | |
| JP | 08511605 | | 12/1996 | |
| JP | 2002323059 | | 11/2002 | |
| JP | 2002364735 | | 12/2002 | |
| JP | 2005054962 | | 3/2005 | |
| JP | 2005163804 | | 6/2005 | |
| JP | 2005241008 | | 9/2005 | |
| JP | 2005249159 | | 9/2005 | |
| JP | 2011131822 | | 7/2011 | |
| JP | 2011131878 | | 7/2011 | |
| JP | 2011236976 | | 11/2011 | |
| JP | 5059656 | | 8/2012 | |
| JP | 2012219960 | | 11/2012 | |
| JP | 2013503070 | | 1/2013 | |
| JP | 2013514228 | | 4/2013 | |
| JP | 2013514229 | | 4/2013 | |
| JP | 57057923 | | 6/2015 | |
| WO | 8805509 A1 | | 7/1988 | |
| WO | 0146605 A1 | | 6/2001 | |
| WO | 2005098253 | | 10/2005 | |
| WO | 2011023505 A2 | | 3/2011 | |
| WO | 2011073587 A1 | | 6/2011 | |
| WO | 2011073590 A1 | | 6/2011 | |
| WO | 2012171589 | | 12/2012 | |
| WO | 2014023939 A1 | | 2/2014 | |
| WO | 2014023941 A1 | | 2/2014 | |

OTHER PUBLICATIONS

International Search Report and Written Opinion issued in Application No. PCT/GB2014/052653, dated Jan. 7, 2015.
International Search Report and Written Opinion issued in Application No. PCT/GB2014/052701, dated Jan. 7, 2015.
Photograph of Crown Gears (website <http://www.atlasgear.com/products/crown-gears.php>); dates between Mar. 24, 2013 and Aug. 5, 2015 (dates for web link obtained from Internet Archive https://archive.org/web/).
Photograph of Splines (webiste <http://www.atlasgear.com/products/splines.php>); dates between Mar. 24, 2013 and Aug. 22, 2015 (dates for web link obtained from Internet Archive https://archive.org/web/).
English Translation of Notification of Reasons for Refusal for Japanese Application No. 2016-539637, four pages, dated Jul. 24, 2018.

* cited by examiner

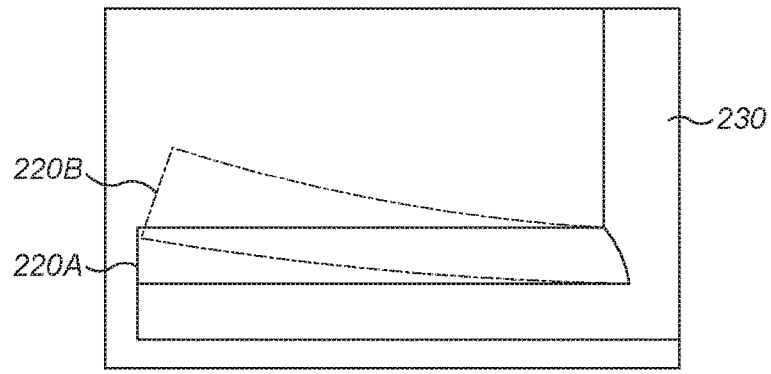
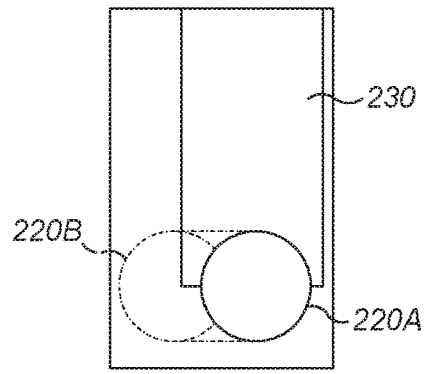
FIG. 1A    FIG. 1B
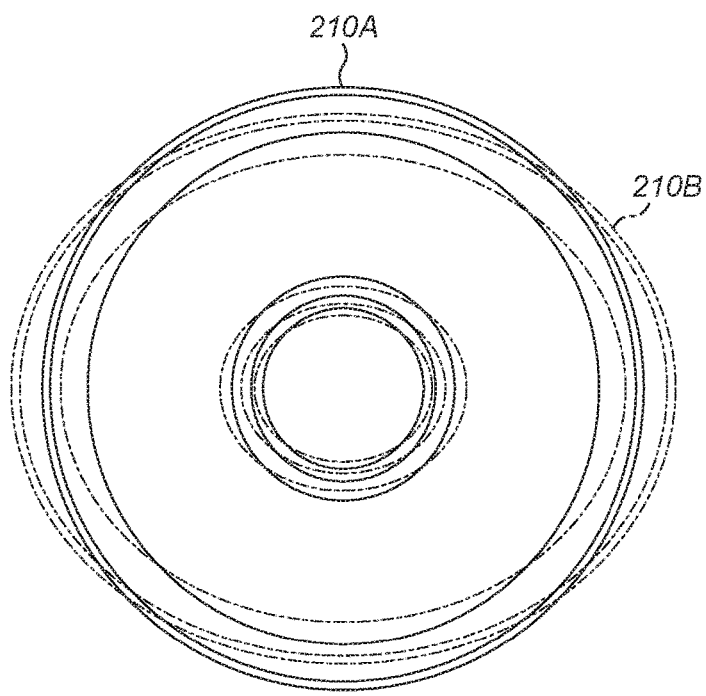
FIG. 1C

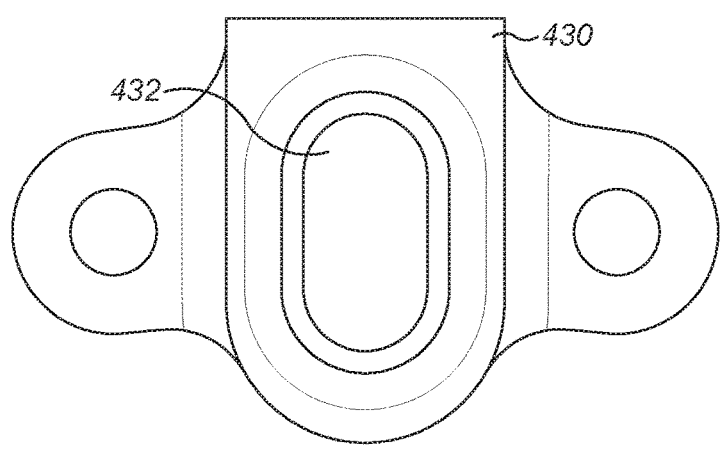
FIG. 6
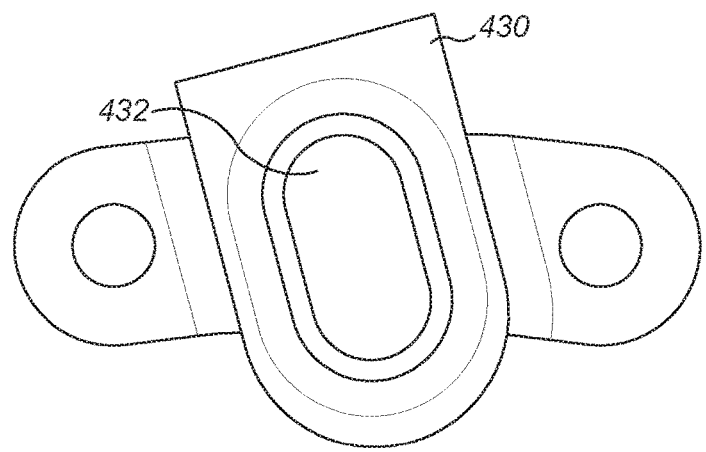
FIG. 7
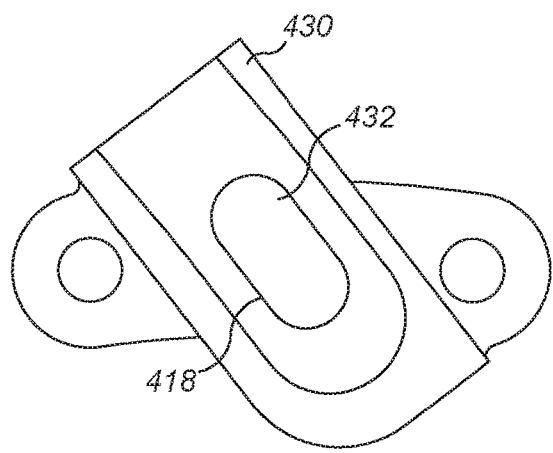 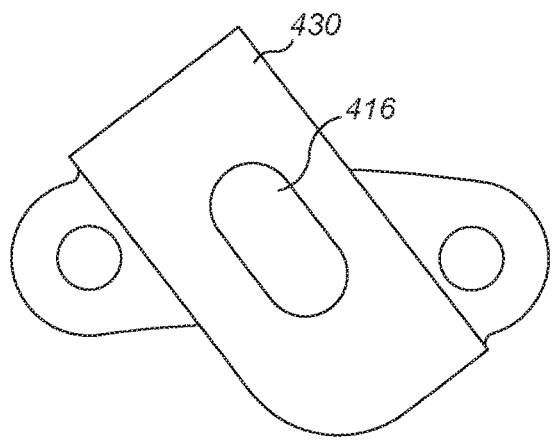
FIG. 8A    FIG. 8B

LANDING GEAR DRIVE SYSTEM FLEXIBLE INTERFACE

RELATED APPLICATIONS

The present application is a Continuation of U.S. application Ser. No. 14/914,669 filed Feb. 26, 2016, which is a National Phase of International Application Number PCT/GB2014/052653 filed Sep. 3, 2014, which claims priority from Great Britain Application Numbers GB 1315802.7 filed Sep. 5, 2013 and GB 1410034.1 filed Jun. 5, 2014.

FIELD OF THE INVENTION

The present invention relates to a flexible interface between an aircraft landing gear wheel and a drive system for rotating that wheel for the purposes of ground taxiing.

BACKGROUND OF THE INVENTION

Aircraft are required to ground taxi between locations on airfields. An example is taxiing between a runway and the location (e.g. terminal gate) at which the aircraft's passengers are to board or disembark. Typically, such taxiing is achieved by using the thrust from the aircraft's engines to propel the aircraft forwards so that the landing gear wheels are caused to rotate. Since ground taxi speeds are necessarily relatively low, the engines must be run at a very low power. This means that there is a relatively high fuel consumption as a result of the poor propulsion efficiency at this low power. This leads to an increased level of both atmospheric and noise pollution locally around airports. Moreover, even when the engines are run at low power it is generally necessary to apply the wheel brakes to limit ground taxi speeds, leading to a high degree of brake wear.

Reversing of a civil aircraft, e.g. away from a terminal gate, using its main engines is not permitted. When reversing is necessary, or in other situations where ground taxiing via main engine thrust is not practicable, tow trucks are used to manoeuvre aircraft around. This process is laborious and costly.

There is therefore a need for a drive system to power the wheels of an aircraft landing gear during ground taxi operations.

Several autonomous ground taxi systems for both driving the wheels while the aircraft is on the ground and spinning them up prior to landing have been proposed in recent years. An example is disclosed in US2006/0065779, which proposes a powered nose aircraft wheel system in which a clutch is used to switch between a mode in which the wheel can spin freely and a mode in which the wheel can be driven by an electric motor. The clutch can also operate to enable the motor to pre-spin the wheel prior to landing.

A prior art arrangement which is not restricted to nose landing gears is described in WO2011/023505. The disclosed system uses an actuator to move a driven toothed pinion gear in and out of driving engagement with a toothed ring gear on the wheel.

SUMMARY OF THE INVENTION

A first aspect of the invention provides a drive system for an aircraft landing gear, the drive system comprising: a pinion gear; a drive shaft arranged to rotate the pinion gear about a drive axis; a driven gear arranged to mesh with the pinion gear to be rotatable by the pinion gear, the driven gear being connectable to a wheel of the landing gear to be capable of rotating the wheel about a wheel axis; and a flexible interface comprising a plurality of driven gear coupling members, each driven gear coupling member having a first connection portion attached to the driven gear, a second connection portion adapted to be attached to the wheel at an offset distance from the wheel axis, and a joint between the first connection portion and the second connection portion, the joint permitting relative movement between the first connection portion and the second connection portion.

The flexible interface thus isolates the drive system from deformation within the landing gear during use, such as wheel axle bending caused by vertical and braking loads, and deformation of the wheel itself, in order to limit wear and/or stresses within the drive system and the wheel.

The joint preferably comprises a spherical joint to provide rotational movement between the first and second connection portions, preferably rotational movement with three or more degrees of freedom. A suitable spherical joint may comprise a ball and socket joint or a spherical bearing, for example. Such rotational movement may serve to isolate the driven gear from misalignment or deformation of the wheel caused e.g. by axle bending, and may additionally help to facilitate assembly of the driven gear with the wheel.

The spherical joint may be further arranged to be capable of translational movement relative to the first connection portion or second connection portion, e.g. by sliding, to achieve translational movement between the first and second portions. Such translational movement may serve to isolate the driven gear from further deformation or misalignment.

In some embodiments the spherical joint may be arranged to be capable of translational movement (e.g. by sliding) along an axis at an angle to the wheel axis (e.g. substantially radial to the wheel axis) to isolate the driven gear from deformation of the wheel shape (e.g. to a lozenge, or oval, shape) caused by tyre loads, and/or from centre distance variations between the driven gear and the pinion gear as a result of wheel rim deformation.

Additionally or alternatively, the spherical joint may be arranged to be capable of translational movement (e.g. by sliding) along an axis substantially aligned with the wheel axis to isolate the driven gear from relative tilting between the driven gear and the pinion gear as a result of wheel axle deflections.

The joint preferably permits relative movement within at least two degrees of freedom.

The joint may permit translation of the first connection portion relative to the second connection portion along a first local axis substantially parallel to (aligned with) the wheel axis. Such movement enables the driven gear to be tilted relative to the wheel to permit isolation of relative tilting between the driven gear and the pinion gear as a result of wheel axle deflections. The joint may comprise a kinematic cylindrical joint or a kinematic sliding joint to provide the translation along the first local axis.

The joint may permit translation of the first connection portion relative to the second connection portion along a second local axis at an angle to the wheel axis. Such movement enables relative translation between the driven gear and the wheel to permit isolation of centre distance variations between the driven gear and the pinion gear as a result of wheel rim deformation, and/or isolation of wheel shape changes (e.g. from round to an oval or lozenge shape) caused by tyre loads. The joint may comprise a kinematic cylindrical joint or a kinematic ball joint (or kinematic spherical joint, e.g. a slidable kinematic spherical joint) to provide the translation along the second local axis. The second local axis may be substantially radial to the wheel axis.

The joint preferably permits: translation of the first connection portion relative to the second connection portion along a first local axis substantially parallel to the wheel axis, translation of the first connection portion relative to the second connection portion along a second local axis at an angle to the wheel axis, and (limited) relative rotation between the first and second local axes.

The driven gear may be substantially ring-shaped and the plurality (preferably 3 or 5, or as many as necessary for successful transmission of torque from the driven gear to the wheel) of driven gear coupling members may be substantially evenly distributed about its circumference.

Each driven gear coupling member preferably comprises a resilient member (such as a spring) arranged to bias the first connection portion towards the wheel axis. In this way the resilient members serve to centre the driven gear with respect to the wheel.

The flexible interface preferably comprises a pinion gear coupling member arranged to connect the pinion gear to the drive shaft to permit tilting of the pinion gear relative to the drive axis. The pinion gear coupling member preferably comprises a crowned spline joint between the drive shaft and the pinion gear. The pinion gear coupling member alternatively comprises a constant velocity joint (CV joint) between the drive shaft and the pinion gear. The pinion gear coupling member may be arranged to permit translation of the pinion gear along the drive axis.

The first connection portion of each driven gear coupling member may comprise a bushing mounted on the driven gear and the joint may comprise a cooperating cylindrical shaft connected to the second connection portion and arranged to slide within the bushing.

The second connection portion of each driven gear coupling member may comprise a socket part and the joint may comprise a ball part connected to the first connection portion (preferably by a rigid connection to the cylindrical shaft) and arranged to rotate and translate within the socket part.

The flexible interface may comprise one or more failsafe catches, each failsafe catch being adapted for attachment to the wheel and arranged to retain the driven gear in the event of a failure of one or more of the driven gear coupling members. The one or more failsafe catches may be attached to the second portion of one or more of the driven gear coupling members.

Preferably, one of the pinion gear and the driven gear comprises a sprocket and the other of the pinion gear and the driven gear comprises a series of rollers arranged to form a ring, each roller being rotatable about a roller axis at a fixed distance from an axis of rotation of the pinion gear or driven gear, respectively. Each of the series of rollers may be rotatable about a pin, the pins each being fixed at at least one end to an annular support member.

A further aspect of the invention provides a drive system for an aircraft landing gear, the drive system comprising: a pinion gear; a drive shaft arranged to rotate the pinion gear about a drive axis; a driven gear arranged to mesh with the pinion gear to be rotatable by the pinion gear, the driven gear being connectable to a wheel of the landing gear to be capable of rotating the wheel about a wheel axis; and a flexible interface comprising a crowned spline joint between the drive shaft and the pinion gear to permit tilting of the pinion gear relative to the drive axis.

Such an arrangement permits relative tilting between the pinion gear and driven gear to accommodate tilting of the driven gear relative to the wheel caused by wheel axle deflections. The splines of the crowned spline joint provide torque transmission from the drive shaft to the pinion gear, while its crowned (or barrelled) shape enables the pinion gear to tilt relative to the drive axis.

The crowned spline joint is preferably arranged to permit translation of the pinion gear along the drive axis. The crowned spline joint may be slidable relative to the drive shaft to achieve such translation.

BRIEF DESCRIPTION OF THE DRAWINGS

Embodiments of the invention will now be described with reference to the accompanying drawings, in which:

FIGS. 1A, 1B and 1C illustrate three modes of deformation experienced by landing gear during use: FIG. 1A shows wheel axle deflection due to vertical loads due to the aircraft weight; FIG. 1B shows wheel axle deflection due to (horizontal) braking loads; and FIG. 1C shows wheel rim deformation due to tyre loads;

FIGS. 6, 7, 8A and 8B illustrate variations on the ball/cylindrical joint socket of a driven gear coupling member according to an embodiment of the invention.

DETAILED DESCRIPTION OF EMBODIMENT(S)

An aircraft landing gear experiences many different modes of deformation during use. In particular, each wheel axle 220 is deflected relative to the landing gear leg 230 as a result of the vertical loads due to the weight of the aircraft (FIG. 1A; 220A indicates the wheel axle before deflection, and 220B indicates it after deflection) and the horizontal loads applied during braking (FIG. 1B; 220A indicates the wheel axle before deflection, and 220B indicates it after deflection). In addition, the shape of each wheel rim 210 is deformed (to a lozenge, or oval, shape) due to tyre loads (FIG. 1C; 210A indicates the wheel rim before deflection, and 210B indicates it after deflection). Each deformation mode typically provides deformation within the range of +/−10 mm at the extremities of the wheel. For example, the vertical height of the wheel may be reduced by 10 mm as a result of wheel distortion by tyre loads, and the wheel may tilt through about 2-3 degrees as a result of axle bending caused by vertical aircraft loads, resulting in a displacement of about 10 mm at the periphery of the wheel rim.

Figure 2:
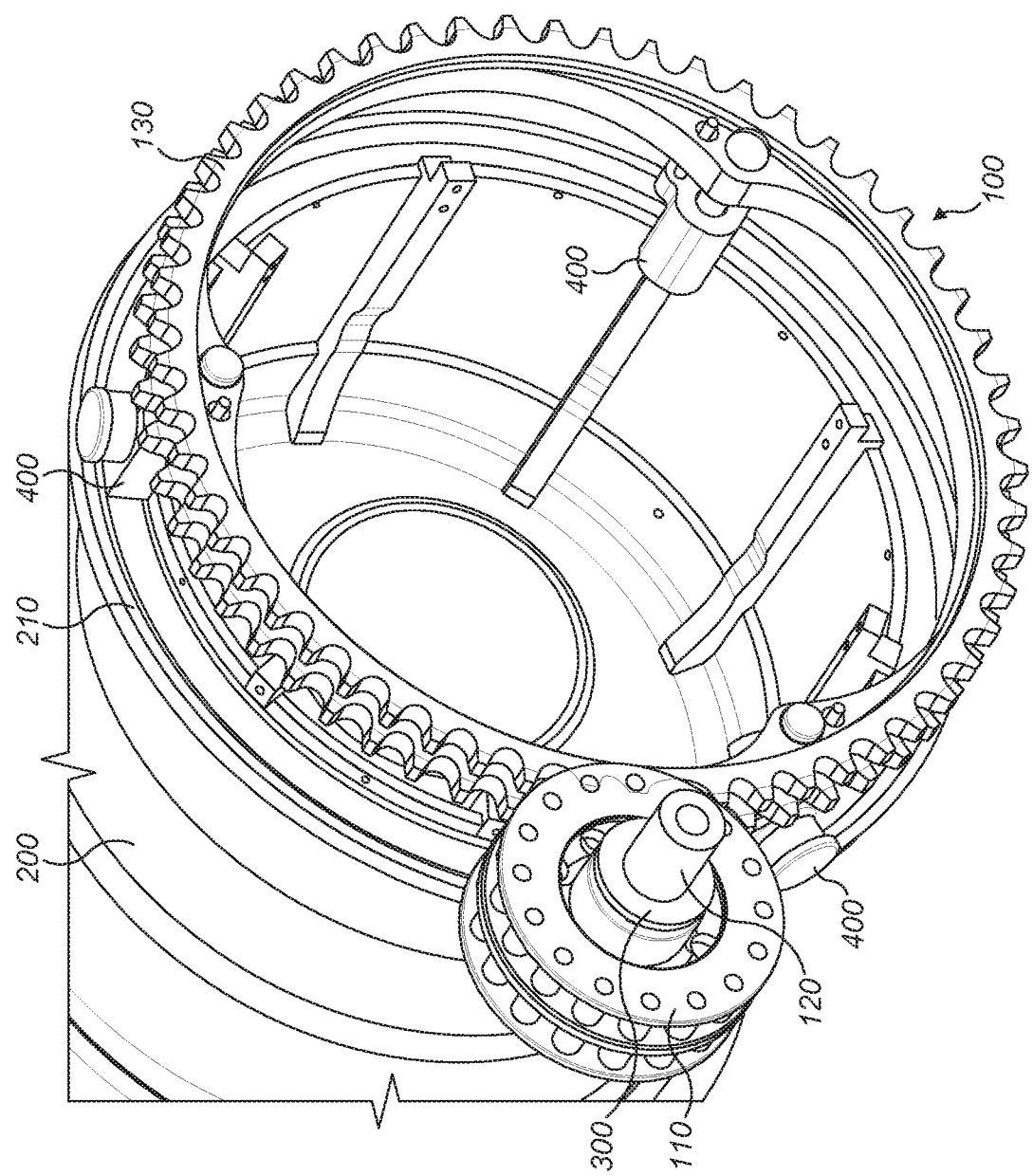
FIG. 2 shows a drive system according to an embodiment of the present invention, with the motor and various features of the landing gear omitted for clarity.
Figure 3:
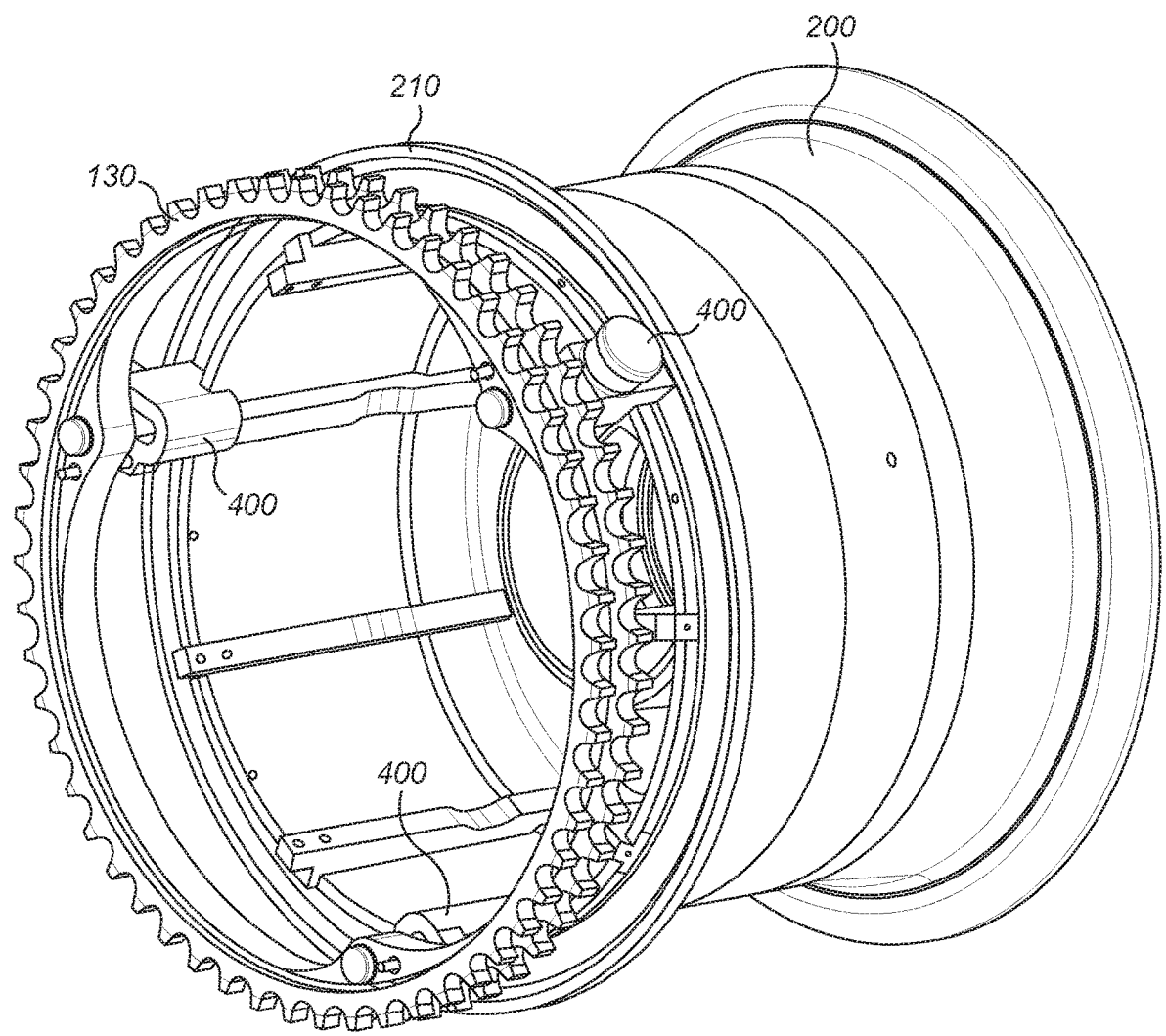
FIG. 3 shows the embodiment of FIG. 2 with the pinion gear omitted.
Figure 4:
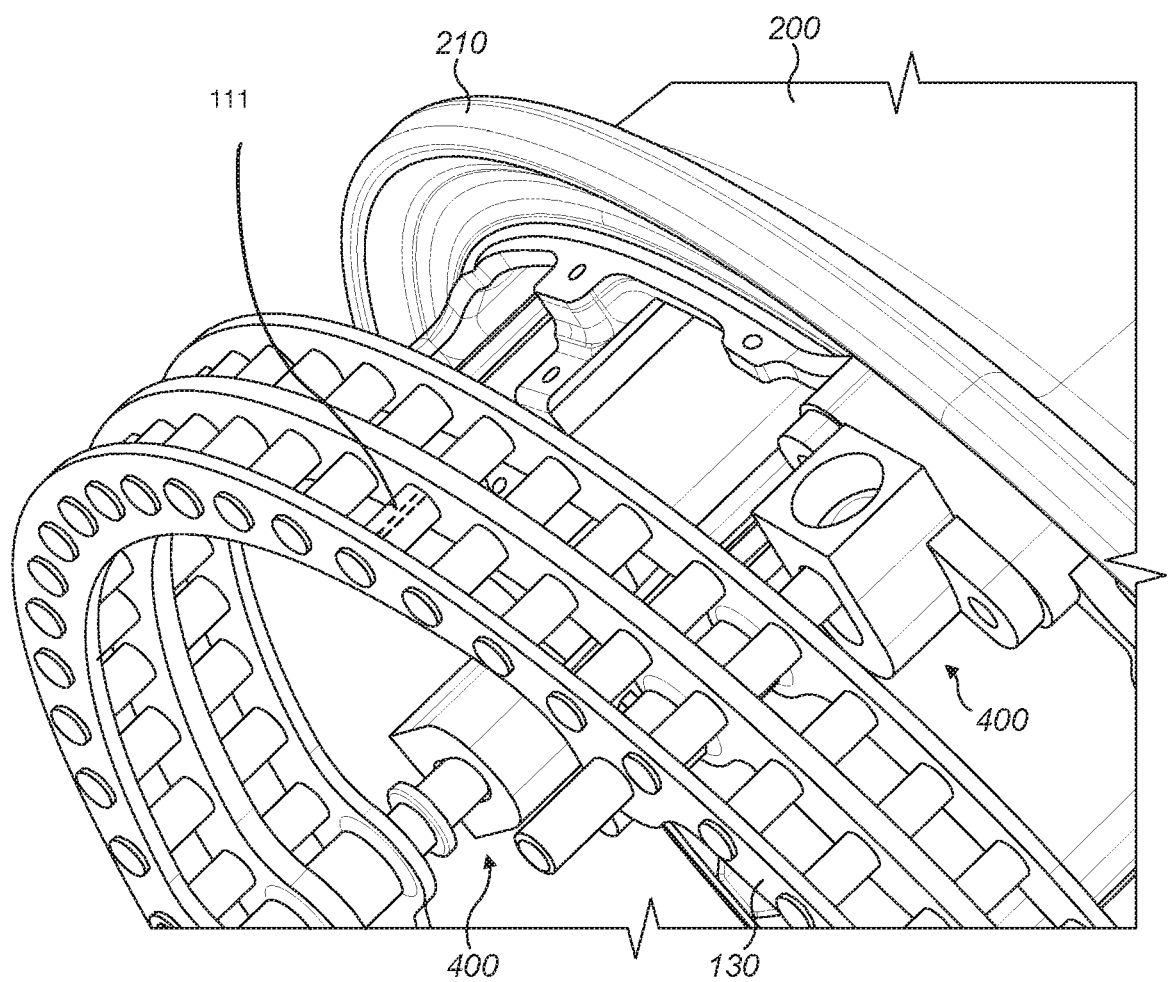
FIG. 4 shows a detail view of the embodiment of FIGS. 2 and 3.
Figure 5A:
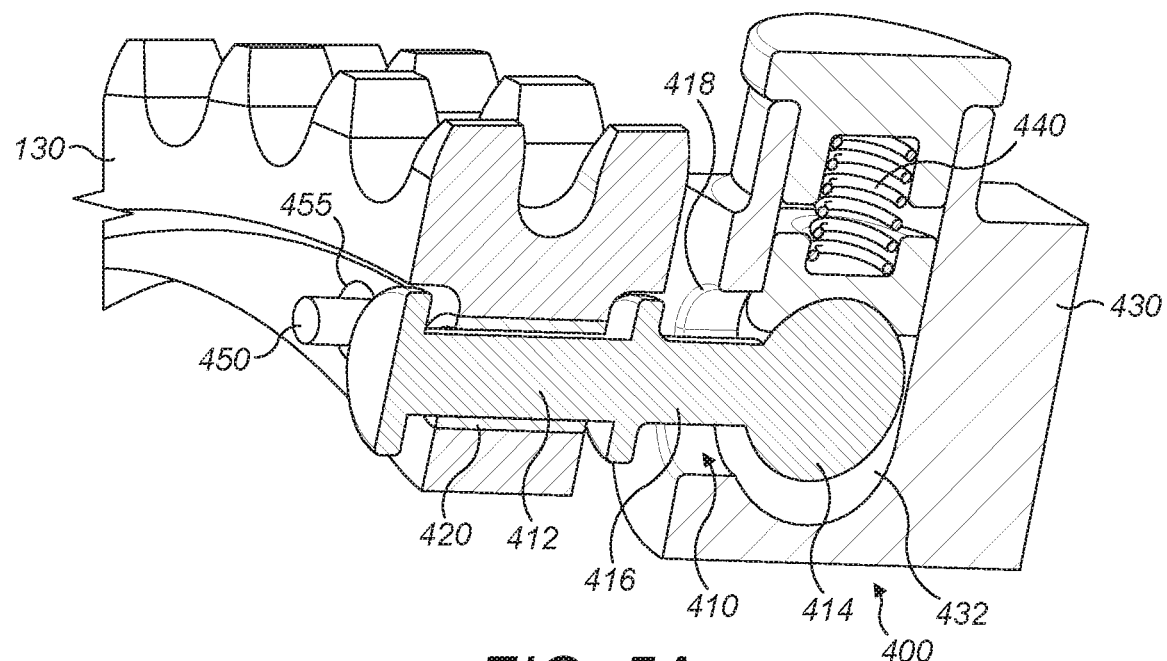
FIGS. 5A and 5B show a driven gear coupling member of a flexible interface according to an embodiment of the invention.
Figure 5B:
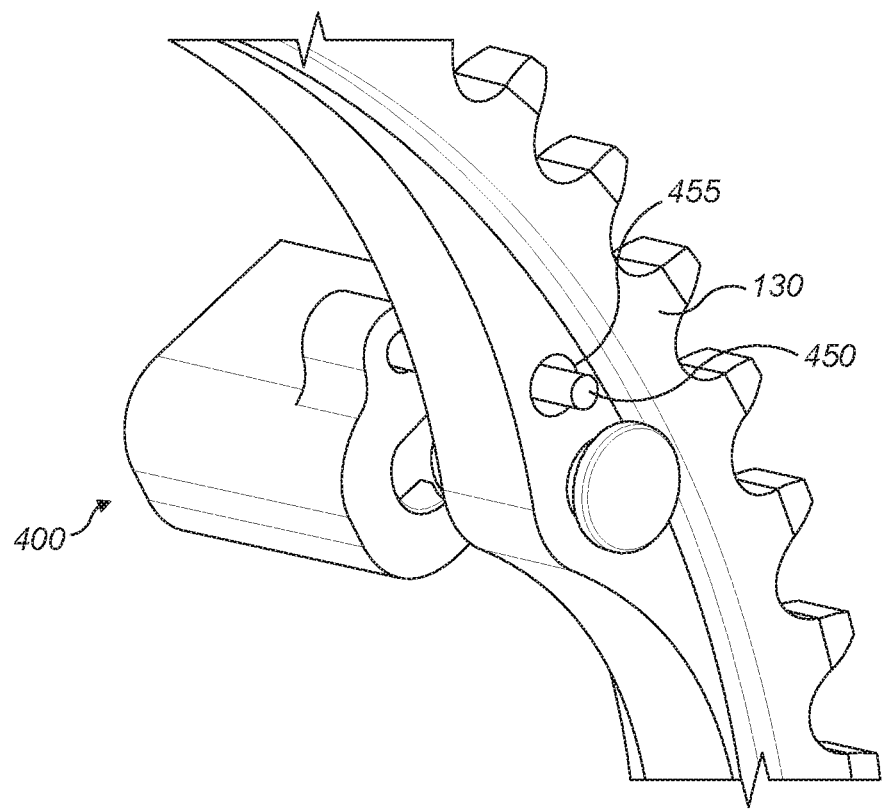

A drive system 100 for autonomous taxiing of an aircraft according to an embodiment of the present invention as shown in FIGS. 2 to 4 is arranged to drive a wheel 200 of the landing gear. The drive system 100 comprises a pinion gear 110 mounted on a drive shaft 120 via a flexible interface comprising a crowned spline joint 300, the drive shaft 120 being driven by an appropriately geared motor (not shown). The motor may be arranged to drive only one wheel, or two or more wheels via a differential or similar. Thus, one, some, or all of the wheels of the landing gear may be actively driven by the drive system, and there may be multiple drive systems per landing gear. The pinion gear 110 is meshed with a driven gear 130 which is in the form of an annular rim gear attached to a wheel rim 210 of the wheel 200 via a flexible interface comprising three driven gear coupling members 400 distributed evenly around the wheel rim 210. The driven gear has a larger diameter than the drive pinion. This arrangement provides for a torque-magnifying gear ratio and an efficient use of space.

The deformation modes discussed above can result in misalignment and/or distortion within the drive system 100 since the pinion gear 110 is mounted on the leg or axle (not shown) of the landing gear, while the driven gear 130 is mounted on the wheel 200, which is rotatable about the axle. In the absence of the flexible interface 300, 400, the axle deflections (FIGS. 1A and 1B) can result in a tilt of the driven gear 130 with respect to the pinion gear 110, i.e. the rotational axes of these gears are tilted with respect to one another. Similarly, in the absence of the flexible interface 300, 400, the wheel rim deformation (FIG. 1C) due to tyre loads can result in a translational displacement of the driven gear 130 with respect to the pinion gear 110, i.e. the rotational axes of these gears are displaced with respect to one another. Such wheel rim deformation may also cause undesirable distortion of the driven gear 130. Alternatively, a rigid connection between the driven gear 130 and the wheel 200 may cause further distortion within the wheel rim 210.

The flexible interface 300, 400 serves to isolate the drive system 100 from these deformations.

The driven gear coupling members 400 of the flexible interface each comprise a joint member 410 having a shaft portion 412 which is received within a bushing 420 mounted through a web of the driven gear 130, the shaft portion 412 being capable of both limited translational and rotational movement within the bushing 420 to provide a kinematic cylindrical joint.

The joint member 410 also has a ball portion 414 separated from the shaft portion 412 by a connecting portion 416, the ball portion 414 being received within a socket member 430. The socket member 430 is rigidly connected to the wheel rim 210 and has a socket chamber 432 within which the ball portion 414 is located and a slot opening 416 through which the connecting portion 416 extends and which provides an opening to the socket chamber 432. The socket chamber 432 is generally elongate to permit movement of the ball portion 414 of the joint member 410 along a linear path delimited by the extent of the slot opening 416. The ball portion 414 is also able to rotate within the chamber 432. In this way, the ball portion 414 and socket member 430 provide a kinematic ball and socket joint.

Each socket member 430 includes a spring 440 which is arranged to urge the ball portion 414 towards the wheel axis. In this way, the three springs 440 serve to centre the driven gear 130 with respect to the wheel rim 210.

Each socket member 430 also includes a catch finger 450 which is rigidly attached to the socket member 430 and extends therefrom through an oversized through hole 455 through the web of the driven gear 130. The through hole 455 is sized to ensure that there is no contact between the catch finger 450 and the driven gear 130 during normal operation of the drive system 100, but if the joint member 410 of the driven gear coupling member 400 were to break, or the coupling member otherwise fail, the catch 450 would retain the driven gear 130 and maintain a connection with the wheel 200.

FIGS. 6, 7, 8A and 8B show possible configurations of the socket member 430, the appropriate configuration being selected according to the specific wheel deformation modes to be accommodated. In FIG. 6 the chamber 432 is arranged to provide a straight linear translation of the ball portion 414 in a substantially radial direction of the wheel axis about which the wheel 200 rotates. In FIG. 7 the chamber 432 is arranged to provide a straight linear translation of the ball portion 414 in a direction which is at an angle to the radial direction of the wheel axis. In FIGS. 8A and 8B the chamber is arranged to provide a curved linear translation of the ball portion 414 (the line in FIG. 8A indicating the line of translation) which is at an angle to the radial direction of the wheel axis.

Figure 9A:
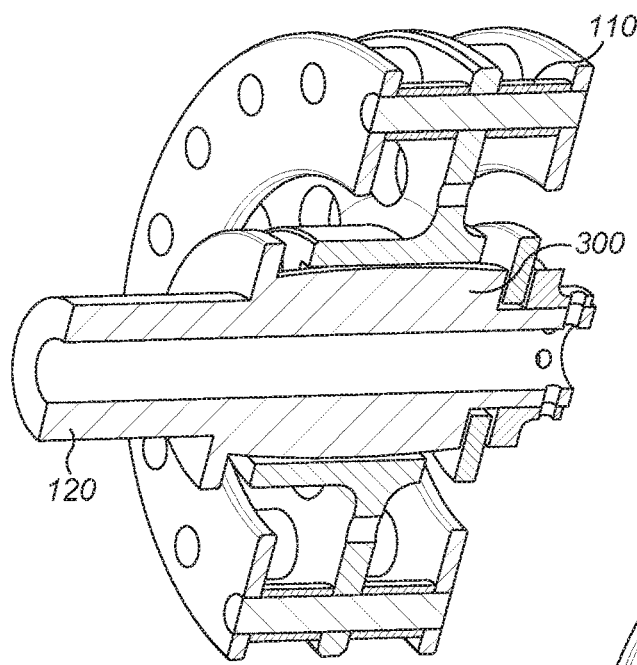
FIGS. 9A, 9B and 9C show a pinion gear coupling of a flexible interface according to an embodiment of the invention.
Figure 9B:
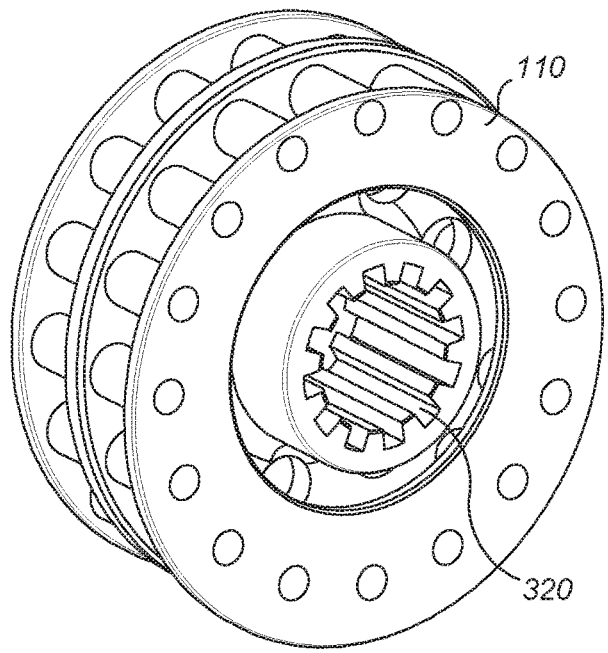
Figure 9C:
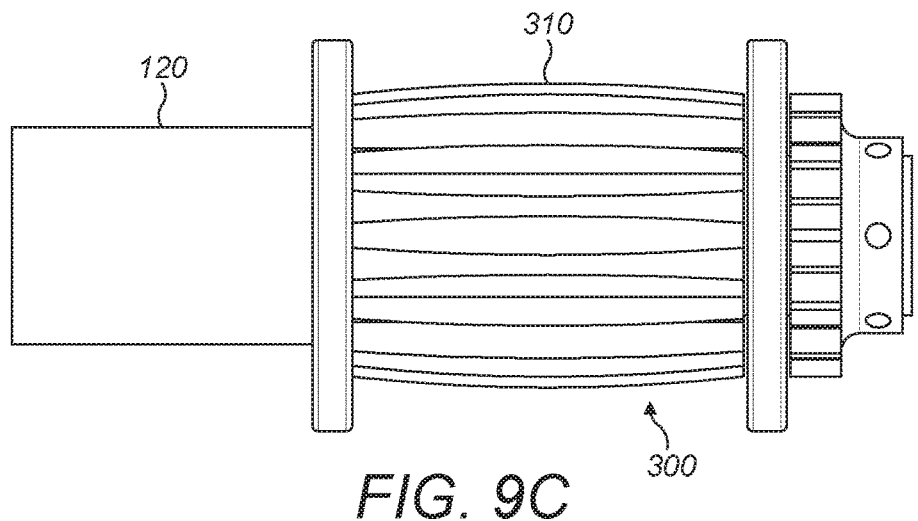

The crowned spline joint 300 shown in FIGS. 9A-9C serves to permit the pinion gear 110 to tilt with respect to the rotational axis of the drive shaft 120. The crowned spline joint 300 includes a plurality of male splines 310 which are arranged to cooperate with a corresponding plurality of female grooves 320 formed in the pinion gear 110. The splines 310 and grooves 320 are curved so that the joint has a barrel shape. The splines 310 are thus able to slide longitudinally within the grooves 320 to permit the pinion gear 110 to tilt with respect to the drive shaft 120. The joint 300 may include ball bearings (not shown) within the grooves 320 to facilitate this movement.

In alternative embodiments the crowned spline joint 300 may be replaced by a constant velocity (CV) joint.

In other embodiments the crowned spline joint 300 may be slidably mounted on the drive shaft 120 to permit relative translation between the pinion gear 110 and the drive shaft 120. In such embodiments it may not be necessary for the driven gear coupling members 400 to include the shaft portion 412 and the bushing 420, and instead the connecting portion 416 may be rigidly connected to the driven gear 130.

In yet further embodiments the ball portion 414 and socket chamber 432 may be replaced by a shaft portion and bushing (not shown) to provide a kinematic cylindrical joint.

In the illustrated embodiments the pinion gear 110 and driven gear 130 comprise a roller gear (pin gear) or sprocket, respectively. In other embodiments the pinion gear 110 may comprise a sprocket and the driven gear 130 may comprise a roller gear. A roller gear comprises a series of rollers formed by two rigid annular rings connected together by a series of rollers arranged in a ring to form a continuous track. The rollers are each rotatable about a pin 111 which extends between the annular rings to form a rigid connection between the annular rings. In the illustrated embodiments the roller gear is shown as having two adjacent rows of rollers; in other embodiments only a single row of rollers may be necessary.

A key advantage of achieving the motor-wheel connection via a sprocket and roller gear is that such a mechanism is inherently robust and tolerant of environmental contamination. Thus, it may not be necessary to enclose the drive system within a casing to prevent ingress of debris and other contaminants. In contrast, drive system arrangements employing meshing toothed gears, must be suitably protected from contaminants, the required protective casing adding both weight and expense, and making routine inspection difficult.

Another advantage of the sprocket-roller arrangement is that it is more tolerant of wheel deformation and misalignment between pinion and driven gear than meshing toothed gear arrangements.

In other embodiments the roller gear may be replaced by a roller chain (also known as an attachment chain, or attachment roller chain) extending around an outer circumference of a support member and being fixed thereto.

In yet further embodiments the driven gear and pinion gear may comprise toothed gears of the type usually used in drive transmissions.

Although the invention has been described above with reference to one or more preferred embodiments, it will be appreciated that various changes or modifications may be made without departing from the scope of the invention as defined in the appended claims.

The invention claimed is:

1. A drive system for an aircraft landing gear, the drive system comprising:
    a pinion gear having a hub;
    a drive shaft connected to a motor and arranged to rotate the pinion gear about a drive axis;
    a driven gear arranged to mesh with the pinion gear to be rotatable by the pinion gear, the driven gear being connectable to a wheel of the landing gear to be capable of rotating the wheel about a wheel axis;
    a flexible interface comprising a pinion gear coupling member arranged to connect the pinion gear to the drive shaft to permit tilting of the pinion gear relative to the drive axis,
    wherein the pinion gear coupling member comprises a crowned spline joint between the drive shaft and the pinion gear; and,
    wherein the hub of the pinion gear is bounded between a flange permanently fixed with the drive shaft at an end of the crowned spline joint proximal to the motor and a flange removably fixed to the drive shaft at an opposite end of the crowned spline joint distal to the motor.

2. A drive system according to claim 1, wherein the joint permits relative movement within at least two degrees of freedom.

3. A drive system according to claim 1, wherein the pinion gear coupling member comprises a constant velocity joint (CV joint) between the drive shaft and the pinion gear.

4. A drive system according to claim 1, wherein the pinion gear coupling member is arranged to permit translation of the pinion gear along the drive axis.

5. A drive system according to claim 1, wherein one of the pinion gear and the driven gear comprises a sprocket and the other of the pinion gear and the driven gear comprises a series of rollers arranged to form a ring, each roller being rotatable about a roller axis at a fixed distance from an axis of rotation of the pinion gear or driven gear, respectively.

6. A drive system according to claim 5, wherein each of the series of rollers is rotatable about a pin, the pins each being fixed at at least one end to an annular support member.

7. A drive system according to claim 1, wherein the crowned spline joint comprises a plurality of curved male splines positioned in a middle portion of the drive shaft.

* * * * *